United States Patent
Karlsson et al.

(10) Patent No.: US 8,452,443 B2
(45) Date of Patent: May 28, 2013

(54) METHOD FOR CONTROLLING A PLURALITY OF AXES IN AN INDUSTRIAL ROBOT SYSTEM AND AN INDUSTRIAL ROBOT SYSTEM

(75) Inventors: Jan H. Karlsson, Åsbro (SE); Antero Lassuri, Karlskoga (SE)

(73) Assignee: ABB Research Ltd, Zurich (CH)

( * ) Notice: Subject to any disclaimer, the term of this patent is extended or adjusted under 35 U.S.C. 154(b) by 527 days.

(21) Appl. No.: 12/679,671

(22) PCT Filed: Oct. 1, 2007

(86) PCT No.: PCT/EP2007/060377
§ 371 (c)(1),
(2), (4) Date: Mar. 24, 2010

(87) PCT Pub. No.: WO2009/043369
PCT Pub. Date: Apr. 9, 2009

(65) Prior Publication Data
US 2010/0204829 A1    Aug. 12, 2010

(51) Int. Cl.
*G01C 17/38* (2006.01)
*G06F 19/00* (2006.01)

(52) U.S. Cl.
USPC ........... 700/164; 700/245; 700/250; 600/407; 600/414; 600/417; 600/424; 600/130; 901/2; 901/14; 901/15; 702/95

(58) Field of Classification Search
USPC ................ 700/245, 258, 264, 250; 901/9, 46, 901/2, 14, 15; 29/564; 483/15; 600/407, 414, 600/417, 424, 130; 702/95, 77; 606/1
See application file for complete search history.

(56) References Cited

U.S. PATENT DOCUMENTS 4,362,977 A * 12/1982 Evans et al. ............... 700/254
4,644,897 A   2/1987 Fender
(Continued)

FOREIGN PATENT DOCUMENTS

| DE | 3532305 A1 | 3/1987 |
| EP | 1375088 A | 1/2004 |
| EP | 1731259 A1 | 12/2006 |
| WO | WO-2007/085330 A | 8/2007 |

OTHER PUBLICATIONS

PCT/ISA/210—International Search Report—Sep. 30, 2008.
(Continued)

*Primary Examiner* — Ronnie Mancho
(74) *Attorney, Agent, or Firm* — Seppo Laine Oy; Joshua P. Wert

(57) ABSTRACT

An industrial robot system including a workcell including a load area and a process area. A detector detects when a human enters the load area. A manipulator is located in the workcell. At least one positioner is adapted to hold a workpiece and to change the orientation of the workpiece about at least one axis while the manipulator processes the workpiece. A station exchanger is movable about an axis and adapted to move, upon command, the manipulator or the positioner between the load and process area. Each of the axes is provided with a motor and a drive unit. An axis controller is adapted to switch between executing a first task in which the axes of the positioner and the station exchanger are commanded to a standstill, and a second task in which the axes of the positioner and the station exchanger are allowed to move. A safety controller is adapted to supervise, upon detecting that a human is entering the load area, whether any of the station exchanger or the positioner is moving, and to generate a signal which disables the drive unit of the moving axis if it is detected that any of the supervised axes is moving.

15 Claims, 6 Drawing Sheets

U.S. PATENT DOCUMENTS

| | | | |
|---|---|---|---|
| 2006/0111813 A1* | 5/2006 | Nishiyama | 700/253 |
| 2006/0137164 A1* | 6/2006 | Kraus | 29/407.1 |
| 2007/0081879 A1* | 4/2007 | Bonora et al. | 414/217 |
| 2007/0168100 A1* | 7/2007 | Danko | 701/50 |
| 2008/0161970 A1* | 7/2008 | Adachi et al. | 700/253 |
| 2008/0274865 A1* | 11/2008 | Sturm | 483/15 |
| 2009/0171505 A1* | 7/2009 | Okazaki | 700/258 |

OTHER PUBLICATIONS

PCT/ISA/237—Writtten Opinion of the International Searching Authority—Sep. 30, 2008.

* cited by examiner

METHOD FOR CONTROLLING A PLURALITY OF AXES IN AN INDUSTRIAL ROBOT SYSTEM AND AN INDUSTRIAL ROBOT SYSTEM

CROSS-REFERENCE TO RELATED APPLICATIONS

This application is the national phase under 35 U.S.C. §371 of PCT/EP2007/060377 filed 1 Oct. 2007.

FIELD OF THE INVENTION

The present invention relates to an industrial robot system comprising a workcell including a load area and a process area, a manipulator located in the workcell and adapted to process a workpiece, at least one positioner adapted to hold the workpiece and to change the orientation of the workpiece about at least one axis while the manipulator processes the workpiece, and a station exchanger movable about an axis and adapted to move, upon command, the manipulator or the positioner between the load and process area.

The invention further relates to a method for controlling the axes of the positioner and the station exchanger in such an industrial robot system.

A station exchanger is, for example, one of the axes of the manipulator, a linear path along which the manipulator is linearly movable between the positioners, or a device carrying the positioners and rotatable about an axis arranged between the positioners.

PRIOR ART

In general, in a robot system using a manipulator for processing a workpiece, a positioner for changing the position of the workpiece during the processing is combined with the manipulator. The positioner is adapted to hold the workpiece and to change the orientation of the workpiece by rotating it about one ore more axes. Such a positioner is, for example, described in EP 1 731 259. The processing is, for example, arc welding, spot welding, painting, grinding, sealing, water cutting, and gluing.

In certain applications, the workpiece is manually loaded to the positioners, which makes heavy demands on the personal safety for the persons loading the positioner. For security reasons the manipulator and the positioners are placed into a workcell. The workcell is usually an enclosed area; for example, the workcell is enclosed by a fence having an opening provided with a gate or a photo-electric trip device. The operator has to enter and leave the workcell through the opening. The workcell is often provided with a detector detecting when someone enters the workcell through the opening. The workcell comprises at least two areas, a load area into which the robot operator is allowed to enter during loading of the positioner, and a process area including the manipulator and into which the robot operator is not allowed to enter during normal operation. The operator is only allowed to enter the process area if the manipulator is put into a safe stop state. A station exchanger moves upon command the manipulator or the positioner between the load area and the process area of the workcell.

In order to save cycle time, two or more positioners can be used. One or more of the positioners are loaded with a new workpiece at the same time as the manipulator is processing another workpiece. The station exchanger is adapted to change, upon command, which one of the positioners the manipulator is performing work on, and to carry out the change by moving the manipulator or the positioners about an axis.

FIGS. 1-5 show different types of workcells provided with a manipulator, at least one positioner, and a station exchanger.

FIG. 1 shows a first type of workcell including a manipulator 1 adapted to process a workpiece 2, a first positioner 4 adapted to hold the workpiece 2 and to change the orientation of the workpiece by rotating it about an axis A1, a second positioner 5 adapted to receive a new workpiece and to change the orientation of the workpiece by rotating it about an axis A2, and a station exchanger 7 adapted to carry the positioners 4,5. The station exchanger 7 is movable about an axis A3 and adapted to change, upon command, which one of the positioners 4,5 the manipulator is performing work on. In this type of workcell, the station exchanger is a device arranged separate from the manipulator. The workcell is divided into two areas: a load area 9a and process area 9b including the manipulator 1. The station exchanger is arranged such that when one of the positioners is located in the process area, the other positioner is located in the load area. The station exchanger is adapted to change which one of the positioner is located in the load area and which one is located in the load area, by moving the positioners between the process area and the load area.

The robot operator is allowed to enter the load area for loading the positioner located in the load area with a new workpiece while the robot is processing a workpiece held by the positioner located in the process area. When the robot has finished processing the workpiece, the station exchanger rotates about its axis and the positioners change their places so that the positioner holding the processed workpiece is located in the load area and the new workpiece is located in the process area.

The load area is provided with an opening 11. The only possibility for someone to enter the load area is through this opening. It is dangerous for a person to enter the load cell when any of the axis of the station exchanger, or the axes of the positioner located in the load area, is moving. Those axes are deactivated before the operator is allowed to enter the load area. For safety reasons, the opening 11 is provided with a sensor 6 detecting when a human enters the load area. The system also comprises an activation button 8 located outside the workcell. When the operator has left the load area he pushes the activation button in order to activate the axes again.

FIG. 2 shows the same type of workcell as shown in FIG. 1, including a station exchanger 20 having four positioners 10a-d, each positioner adapted to hold a workpiece and to change the orientation of the workpiece by rotating it about an axis A4-A7.

FIG. 3 shows another type of workcell including a manipulator 1, a first positioner 22 adapted to hold a workpiece and to change the orientation of the workpiece by rotating it about an axis A8 and a second positioner 24 adapted to receive a new workpiece and to change the orientation of the workpiece by rotating it about an axis A9. The positioners are arranged fixed in the room, and a first axis A10 of the manipulator functions as a station exchanger. When the manipulator has finished processing a workpiece, the manipulator rotates about its first axis until it reaches the other positioner and then begins to process the next workpiece. The manipulator and the positioners are located in a workcell. The workcell in divided into three areas, one process area 26 and two load areas 28,30. In order to ensure safety for the person loading the positioners, the axis of the station exchanger, i.e. the first axis of the manipulator, and the axis of the positioner located in the load area are deactivated before the person is allowed to enter the load area. The axes are activated again when the person has left the load area. Each load area is provided with an opening 11a, 11b for the operator to enter the load area. Each opening 11a-b is provided with a sensor 6a-b detecting when a human enters the load area.

FIG. 4 shows a workcell including a manipulator 1 adapted to process a workpiece 2, a first positioner 32 adapted to hold the workpiece 2 and to change the orientation of the workpiece by rotating it about an axis A11, a second positioner 34 adapted to receive a workpiece and to change the orientation of the workpiece by rotating it about an axis A12, and a station exchanger in the form of a linear path 35 having a linear axis A13 along which the manipulator is linearly movable. The workcell has two load areas 36a,37a and two process areas 36b,37b. Each process and load area is provided with a positioner 32,34. The manipulator is movable between the two process areas. Each load area is provided with an opening 11a, 11b for the operator to enter the area. A person is not allowed to enter a load area if the manipulator is within the corresponding process area, or if the positioner in the load area is moving. In order to ensure safety for the person loading the positioners, the axis of the station exchanger, i.e. the linear axis A13, and the axis of the positioner located in the load area are deactivated before the person is allowed to enter the load area. The axes are activated again when the person has left the load area.

FIG. 5 shows another type of workcell including a manipulator 1 and one positioner 22 arranged fixed in the room. A first axis A10 of the manipulator functions as a station exchanger. The workcell in divided into a load area 38 and a process area 39 to which the manipulator, for safety reasons, is moved during loading of the positioner 22. The positioner is located at the border between the load and process area. The manipulator is located in the process area, but the working range of the manipulator extends into the load area so that the manipulator can reach the positioner and process the workpiece hold by the positioner. When the manipulator has finished processing a workpiece, the manipulator rotates about its first axis until it is entirely within the process area 38. The operator loads the positioner and when the positioner has been loaded, the manipulator is rotated about its first axis A10 in the opposite direction until the manipulator can reach the positioner and perform work on the loaded workpiece.

FIG. 6 shows a prior art control system for controlling the axes of the station exchanger and the positioners. The control system comprises an axis controller 40 adapted to control the movements of the axis of the station exchanger and the positioners, and a safety controller 42 adapted to supervise the workcell and to generate stop signals to the axes. A common drive unit 44 is used for controlling the motors M1, M2 of the positioners as well as the motor M3 of station exchanger. Each connection between the drive unit 44 and the motor is provided with a relay 46 for connecting and disconnecting the motor to the drive unit. Each motor is provided with a device R1-R3 measuring the position of the axis. The axis controller 40 receives information on the actual positions $\phi_1$, $\phi_2$, $\phi_3$ of the axes and sends reference signals $\phi_{ref}$ for the position and velocity of the axes to the drive unit.

In order to ensure safety for the person loading the positioners, the axis of the station exchanger and the axis of the positioner located in the load area are deactivated before the person is allowed to enter the load area. The axes are activated again when the person has left the load area. Thus, the axes have to be activated and deactivated once each work cycle.

The following steps activates an axis:
1) The relay 46 between the drive unit and the motor of the axis is operated, in order to connect the motor to the drive unit
2) The drive unit 44 is enabled, which means that the current to the motor is switched on, for example by turning on the power supply to the drive unit.
3) The brake on the motor is released.

In order to deactivate an axis the same steps are carried out, but in the opposite order. The total time for activating and deactivating an axis is 1.4 s.

When it is detected that a human is entering the load area, the safety controller 42 checks whether the axis of the station exchanger and the positioner located in the load area are deactivated. Checking that the relays are disconnected does this check. If any of the relays are still connected, the whole system is emergency-stopped. The axes are activated when the operator pushes the activation button.

OBJECTS AND SUMMARY OF THE INVENTION

The object of the present invention is to reduce costs and cycle time for an industrial robot system comprising at least two positioners, and a station exchanger.

According to one aspect of the invention, this object is achieved with an industrial robot system.

Such an industrial robot system comprises a workcell including a load area and a process area, at least one detector detecting when a human enters the load area of the workcell, a manipulator located in the workcell and adapted to process a workpiece, at least one positioner adapted to hold the workpiece and to change the orientation of the workpiece about at least one axis while the manipulator processes the workpiece, a station exchanger movable about an axis and adapted to move, upon command, the manipulator or the positioner between the load area and process area, an axis controller adapted to control the movements of the at least two axes, and a safety controller adapted to supervise the workcell and to generate stop signals to the axes.

The invention is characterized in that each of the axes is provided with a motor and a drive unit. Further, the invention is characterized in that the axis controller is adapted to switch between executing at least two tasks: a first task in which the axes of the positioner and the station exchanger are commanded to a standstill, and a second task in which the axes of the positioner and the station exchanger are allowed to move. A task is a control program including program instructions controlling the movements of the axes of the positioner and the station exchanger.

The invention is also characterized in that the safety controller is adapted to continuously receive information on the position of positioner and the station exchanger, and information from the detector, and the safety controller is further adapted, upon detecting that a human is entering the load area of the workcell, to continuously supervise, at least as long as the human is within the load area, whether any of the station exchanger or the positioner is moving, and to generate a signal which disables the drive unit of the moving axis if it is detected that any of the supervised axes is moving, and to keep the drive units of the supervised axes enabled if it is decided that the supervised axes are not moving.

The invention makes it possible to remove the relays for connecting and disconnecting the motors to the drive unit used in the prior art, and thereby reduce hardware costs. Further, the invention makes is possible to keep the drive units of the axes enabled and the brakes off, when the operator is within the load area. Thus, the axes of the positioner and the station exchanger does not have to be deactivated when a human is entering the load area or deactivated when the human has left the load area. Thus, the axes do not have to be activated and deactivated each work cycle, which means that the cycle time is reduced.

Instead of deactivating the axes before a human is entering the load area, the axis controller commands the axes to a standstill. By the expression commanded to a standstill is meant that the axis is commanded to keep its position and to not move. The axes are commanded to a standstill by software in the form of a control program, which is executed on the axis controller. Upon execution of the control program, the axis controller generates reference signals for the position and velocity of the axes. The reference signals are sent to the drive units of the axes, which generate variable currents to the motors driving the axes based on the reference signals. When the axis controller is switched into the first task, the reference signals to the drive units are such that the velocity of the axes are commanded to be zero, and the operator is allowed to enter the load area. When the axis controller is switched into the second task, the operator is not allowed to enter the load area.

However, in order to ensure personal safety for the operator, it is not enough to command the axis to a standstill by software. Defects in the control program may cause movements of the axis when the operator is in the load area. According to the invention, a safe standstill of the axes is guaranteed by supervising the movements of the positioner and the station exchanger when the operator is within the load area. Supervising whether any of the station exchanger or the positioner is moving can, for example, be done based on a measured axis velocity or a velocity calculated based on received positions from a position detection device. Even though the control program commands an axis to a standstill, small, not visible movements may occur due to a regulation system of the axis controller. Thus, the supervision should preferably tolerate small, not visible movements of the axes.

If it is detected that any of the axes is moving, the drive unit of the moving axis is disabled; otherwise, the drive units of the supervised axes are kept enabled. In order to further improve safety it is advantageous to disable the drive units of all axes if it is detected that any of the axes is moving. When the drive unit is disabled the current to the motor is switched off. The drive unit is disabled, for example by removing the power supply to the drive unit.

According to an embodiment of the invention, the robot system comprises a second positioner adapted to hold a workpiece and to change the orientation of the workpiece about at least one axis, the station exchanger is adapted to change, upon command, which one of the positioners the manipulator is performing work on, and the safety controller is adapted to continuously receive information on the position the second positioner, and, upon detecting that someone is entering the load area of the workcell, to determine which positioner is within the load area, to continuously detect, at least as long as someone is within the load area, whether any of the station exchangers or the positioners determined to be within the load area is moving, and if it is detected that any of the station exchangers or the positioners determined to be within the load area is moving, to generate a signal which disables the drive unit of the moving axis.

Further, the safety controller is adapted to determine which of the positioners is within the process area, and the axis controller is adapted to control the movements of the three axes by switching between executing at least two tasks: a first task in which the axes of the station exchanger and the positioner determined to be within the load area are commanded to a standstill and the axis of the positioner determined to be within the process area is allowed to move, and a second task in which the axes of the station exchanger and the positioners are allowed to move. This embodiment is useful for the workcell types described in FIGS. 1-4, including more than one positioner. This embodiment ensures safety for an operator loading one positioner at the same time as the manipulator is performing work on workpiece held by another positioner and the axis of the other positioner is rotated.

The safety controller is adapted to determine which positioner is within the load area and which positioner is within the process area based on the position of the axis of the station exchanger.

According to an embodiment of the invention, the system comprises an activation means located outside the workcell and the activation means is adapted to generate an operator-ready signal upon activation by a human, and the axis controller is adapted to receive the operator-ready signal and switch to the second task upon receiving the operator-ready signal. This embodiment ensures that the human is outside the workcell when the axis of the station exchanger and the positioner in the load area are allowed to move.

According to an embodiment of the invention, the load area includes the first positioner and the process area includes the second positioner, each area is provided with a detector detecting when someone enters the area, and the station exchanger is adapted to move the manipulator between the load and process area, and the safety controller is adapted to determine upon detecting that someone is entering any of the load and process area, whether the manipulator is within the entered area or not, and if the manipulator is within the entered area, to generate a stop signal to the manipulator. The stop signal to the manipulator disables the drive units of the axis and applies the brakes to the motors of the manipulator. This embodiment is useful for the workcell types described in FIGS. 4 and 5, in which the working range of the manipulator extends into the load area. This embodiment ensures safety for an operator loading a positioner located in a load area into which the manipulator can reach when performing work.

According to another aspect of the invention, this object is achieved by a method for controlling a plurality of axes in an industrial robot system.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 7:
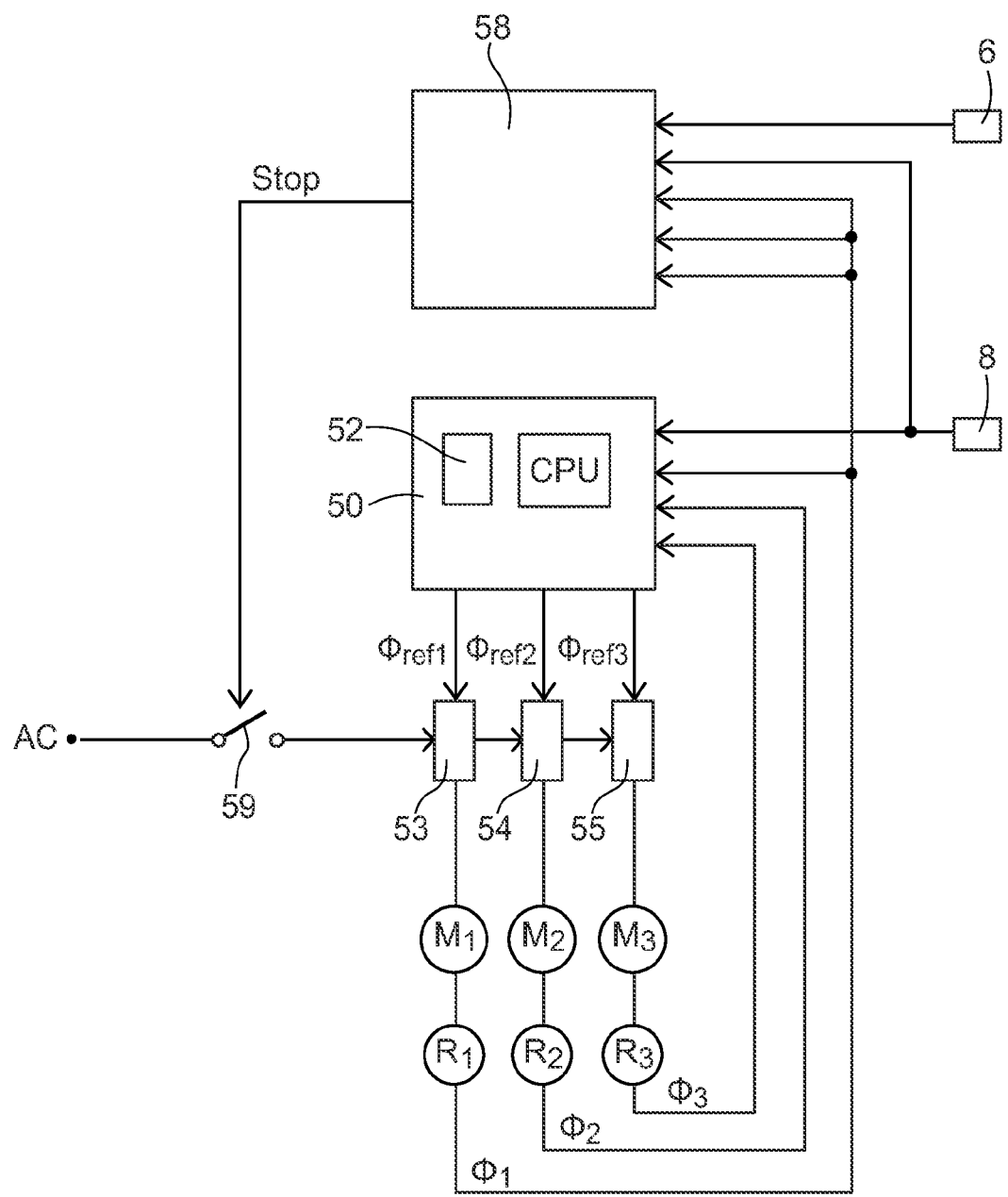
FIG. 7 shows a robot control system according to an embodiment of the invention.

FIG. 7 shows a robot control system according to an embodiment of the invention suitable for controlling the axes of the station exchanger and the positioners in the workcells disclosed in FIGS. 1-5. However, the number of drive units, motors, and position measuring devices has to be adapted to the number of positioners in the workcell type. A plurality of motors $M_1$, $M_2$, $M_3$ achieve the motions of the positioners and the station exchanger. For example, with reference to the workcell shown in FIG. 1, the motor M1 controls the axis A1 of the first positioner, the motor M2 controls the motion of the axes A2, A1 of the first positioner, and the motor M3 controls the motion of the axis A3 of the station exchanger. Each axis is provided with a device R1, R2, R3 for measuring the position $\Phi_1$, $\Phi_2$, $\Phi_3$ of the axis. The device for measuring the position of the axis is, for example, a resolver.

The control system comprises an axis controller 50 adapted to control the movements of the axis of the station exchanger and the positioners. Preferably, the axis controller 50 also controls all the axes of the manipulator 1. The axis controller comprises memory means 52 for storing a robot control program and processing means, such as a CPU, for executing the control program. The axis controller 40 further comprises a servo loop controlling the position of the axes. The axis controller 40 receives information on the actual positions $\Phi_1$, $\Phi_2$, $\Phi_3$ of the axes and generates reference signals $\Phi_{ref1}$, $\Phi_{ref2}$, $\Phi_{ref3}$ for the position and velocity of the axes based on the received information on the actual positions and instructions in the robot control program. In an alternative embodiment, the axis controller includes a main computer for storing and executing the robot program and an axis computer including the servo loop.

The control system further comprises a plurality of drive units 53-55. Each axis is provided with its own drive unit. The axis controller 50 sends reference signals $\Phi_{ref1}$-$\Phi_{ref3}$ for the position of the axes to the drive units 53-55, which control the motors $M_1$-$M_3$ based on the received reference signals. The axis controller 50 also receives a signal from the activation means 8 informing it about the fact that the operator is ready, i.e. the positioner is loaded. The activation means 8 can be any known type of activation means, such as a physical button or a software button shown on a display device. The activation means 8 generates a signal upon activation of the operator and sends the signal to the axis controller 50. In this embodiment, the drive units 53-55 are enabled and disabled by a switch 59, which upon command interrupts the AC power supply to the drive units. The drive units 53-55 include a rectifier rectifying the supplied alternating current and power electronics for generating variable currents to the motors in dependence on the reference values $\Phi_{ref1}$-$\Phi_{ref2}$ from the axis controller 50.

The control system further comprises a safety controller 58 adapted to supervise the workcell and to generate stop signals to the axes. The safety controller 58 is adapted to receive information on the position $\Phi_1$, $\Phi_2$, $\Phi_3$ of the axes of the positioners and the station exchanger from the position measuring devices R1-R3. Further, the safety controller 58 is adapted to receive information from a detector 6, which is detecting whether a human is entering a load area of the workcell. A load area is a dedicated area that the operator is allowed to visit during unloading and loading of the positioner. The detector 6 can be any type of detector detecting when the human is entering a certain area, such as a camera, a photo-electric detector, a laser scanner, a tramp mat, or a door with a limit switch.

Figure 2:
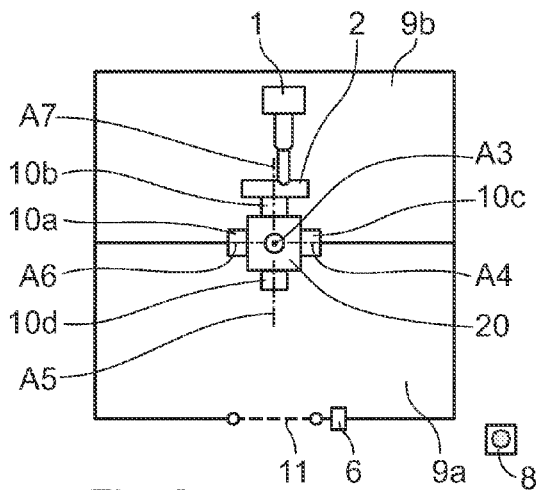
FIG. 2 shows the first type of prior art workcell including four positioners.
Figure 3:
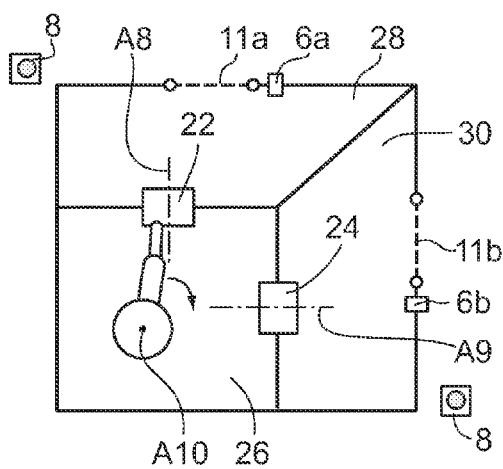
FIG. 3 shows a second type of prior art workcell including a manipulator, two positioners, and a station exchanger in the form of one of the axes of the manipulator.
Figure 4:
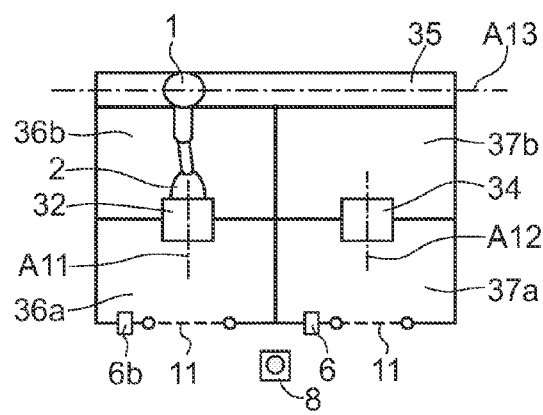
FIG. 4 shows a third type of prior art workcell provided with a manipulator, two positioners, and a station exchanger in the form of a linear path.

The control system shown in FIG. 7 is suitable for controlling the axes of the workcell disclosed in FIG. 2, if the control system is provided with five drive units, each connected to a motor controlling the motion of any of the axes A3-A7. The control system shown in FIG. 7 is also suitable for controlling the workcell shown in FIG. 5 if one of the drive units and motors shown in the figure is removed. The drive unit 53 is then connected to a motor driving the axis A8, and the drive unit 54 is connected to a motor driving the first axis of the manipulator A10, which axis acts as a station exchanger. The control system shown in FIG. 7 is also suitable for controlling the axes of the workcell disclosed in FIGS. 3 and 4, if the safety controller receives information from the detectors 6a and 6b when a human in entering any of the load areas 28 or 30, and 36 and 37.

The axis controller 50 is adapted to switch between executing at least two tasks: a first task in which the axis controller commands the axes of the positioner in the load area and the axis of the station exchanger to standstill, and a second task in which the axes of the positioners and the station exchanger are allowed to move. The first task is to be used when the operator enters the load area and detaches the finished workpiece from the positioner in the load area and loads the positioner with a new workpiece. The second task is to be used when the operator is outside the workcell. When the axis controller executes its second task, the station exchanger is allowed to move about its axis and move the manipulator or the positioner between the load area and a work or safety area of the workcell. The operator is not allowed to enter the workcell when the axis controller executes the second task. A task is a program written in a robot language including program instructions controlling the movements of the axes of the positioners and the station exchanger.

Figure 5:
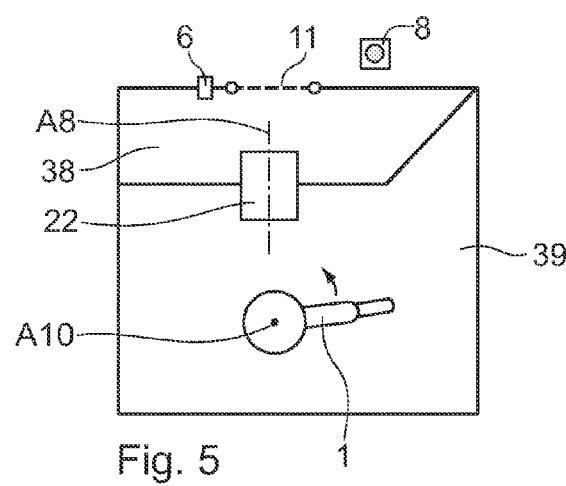
FIG. 5 shows a fourth type of prior art workcell including a manipulator, one positioner, and a station exchanger in the form of one of the axes of the manipulator.
Figure 6:
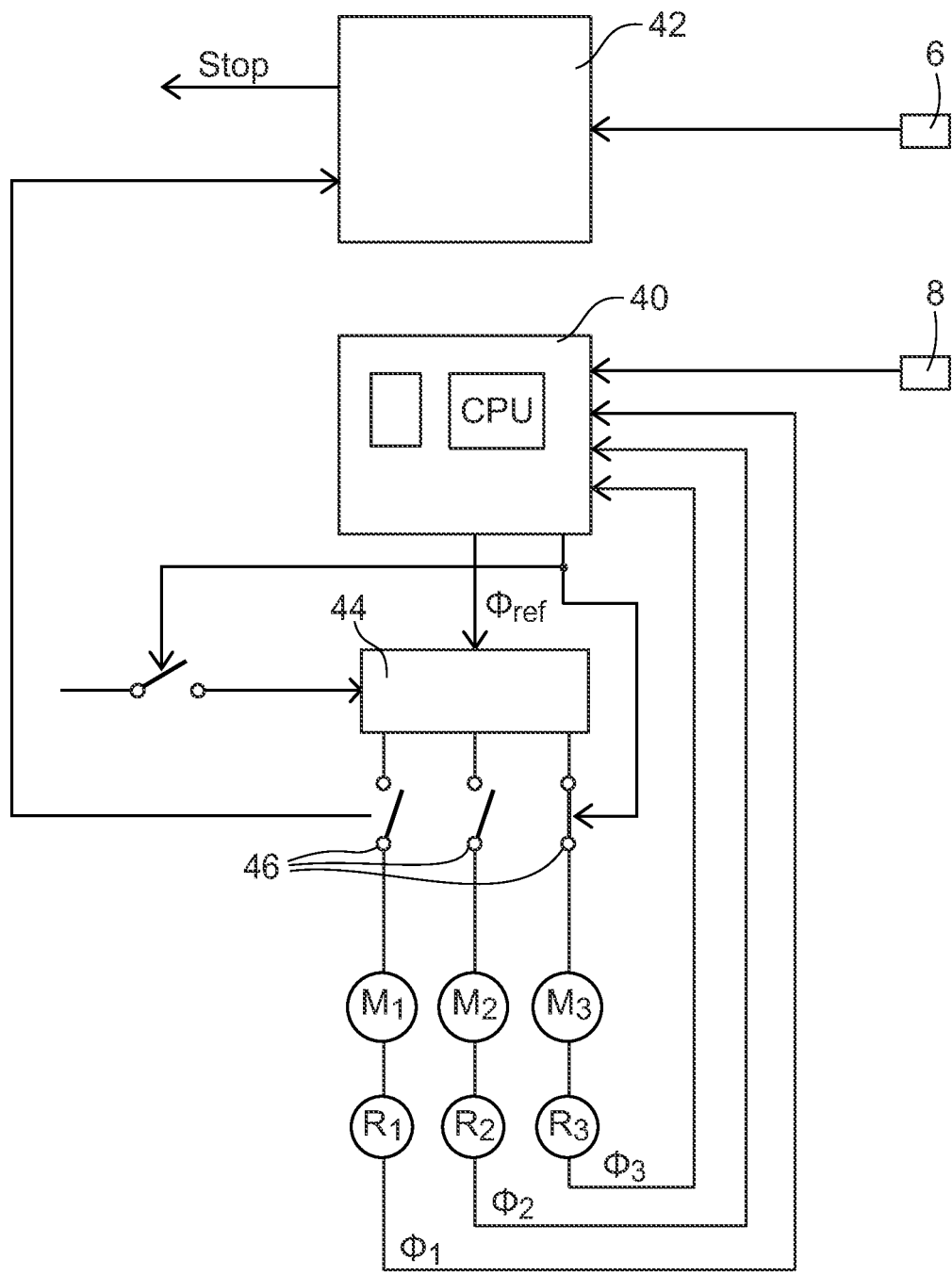
FIG. 6 shows an example of a prior art robot control system.
Figure 8:
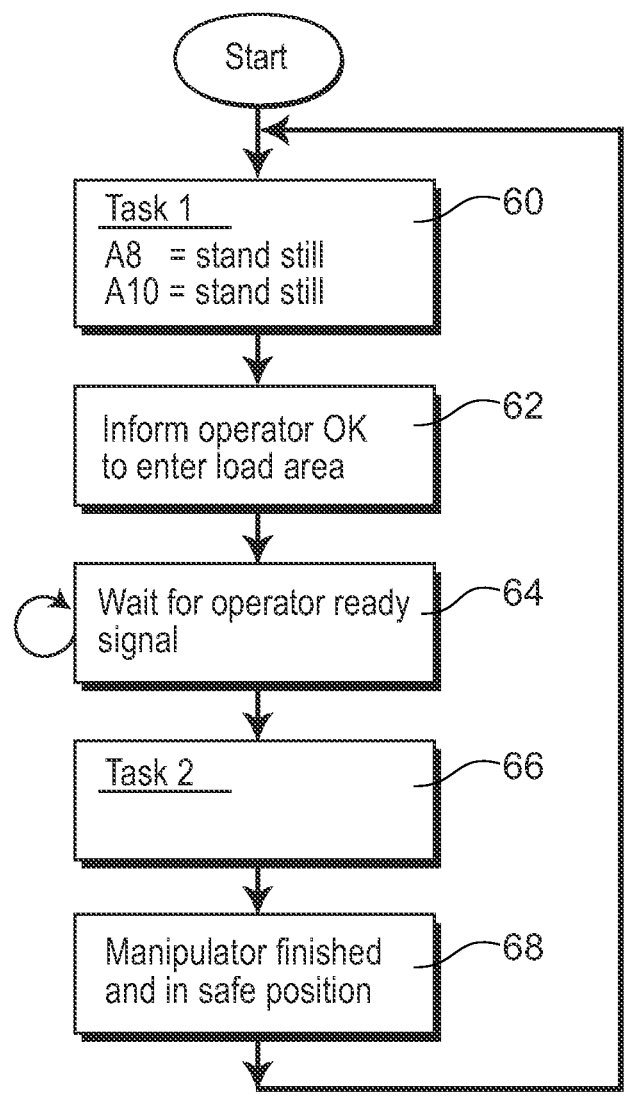
FIG. 8 shows an example of a flow diagram of a program for controlling the axes of a positioner and a station exchanger.

FIG. 8 shows an example of a flow diagram of a program for controlling the axes of a positioner and a station exchanger arranged as shown in FIG. 5. It will be understood that each block of the flow diagram is implemented by computer program instructions in a robot control program. The robot control program can be written in any type of programming language. The type of language used depends on the type of robot.

The robot program sets the axis computer into task 1 by commanding the axis A8 of the positioner and the axis A10 of the station exchanger to a standstill, block 60. The axes are commanded to standstill by generating reference signals $\Phi_{ref1}$, $\Phi_{ref2}$ for the axes that are constant during the first task. The operator is informed about the fact that it is now safe to enter the load area 38, block 62. This information is, for example, provided by switching on a green lamp. When the operator is finished and has left the load area 38, he activates the activation means 8 and the axis controller receives the operator-ready signal, block 64. As long as no operator-ready signal is received, the axes are continuously commanded to a standstill. If an operator-ready signal is received the axis controller switches to task 2, block 66. When the axis computer is in the second task, reference signals for the movements of the axes are generated based on program instructions in the robot control program. The control program first commands axis A10 to turn around the manipulator so that it can reach the positioner 22. Thereafter, the control program commands the positioner to rotate about axis A8, while the manipulator processes the workpiece held by the positioner. When the manipulator has finished processing the workpiece, axis A10 is commanded to return to a safe position within the safety area 39. As long as it is not safe to enter the load area the operator is informed of that, for example by a red lamp.

Figure 1:
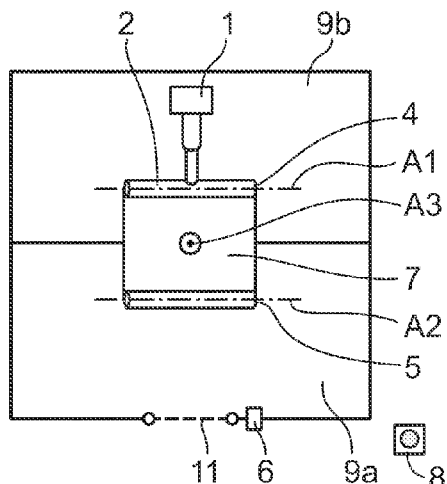
FIG. 1 shows a first type of prior art workcell including a manipulator, two positioners, and a separate station exchanger.
Figure 9:
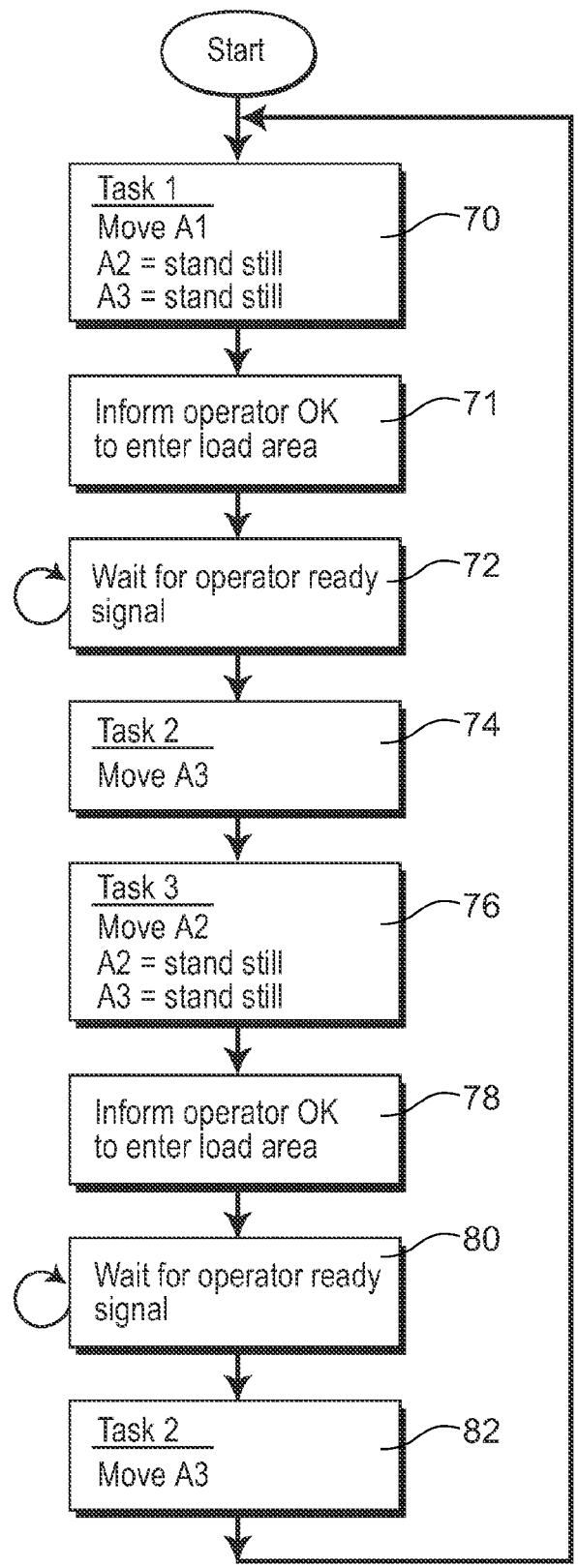
FIG. 9 shows an example of a flow diagram of a program for controlling the axes of two positioners and a station exchanger.

FIG. 9 shows an example of a flow diagram of a program for controlling the axes of two positioners and a station exchanger, such as shown in FIG. 1. In this case, the station exchanger is adapted to move, upon command, the positioners about its axis and thereby switching which of the positioners is within the load and process area. The axis controller is adapted to control the movements of the three axes A1, A2 and A3 by switching between three tasks.

In a first task the axis A1 of the first positioner 4 is allowed to move, and the axes A2, A3 of the station exchanger 7 and the second positioner 5 are commanded to a standstill. The first task is used when the first positioner 4 is located in the process area and the second positioner 5 is located in the load area. In the first task, the operator is allowed to enter the load area and switch the workpiece held by the second positioner 5, at the same time as the manipulator 1 processes the workpiece held by the first positioner 4.

In a second task, all three axes A1-A3 are allowed to move. During this task the station exchanger 7 is moved about its axis A3 and the locations of the positioners are switched. The operator is not allowed to enter the load area during the second task.

In a third task the axis A2 of the second positioner 5 is allowed to move and the axis of the first positioner 4 and the axis A3 of the station exchanger are commanded to a standstill. The first task is used when the second positioner 5 is located in the process area and the first positioner 4 is located in the load area. During the third task, the operator is allowed to enter the load area in order to load the first positioner 4 with a new workpiece, at the same time as the manipulator 1 processes the workpiece hold by the second positioner 5.

As shown in FIG. 9, the safety controller is switched into the first task when the first positioner 4 is located in the process area 9b and the second positioner 5 is located in the load area 9a, block 70. The axis A1 of the first positioner is moved according to a reference signal $\Phi_{ref1}$ generated by the axis controller based on the instructions in the robot control program. At the same time the axis A2 of the second positioner 5 and the axis A3 of the station exchanger are commanded to a standstill. As long as the axis computer is in the first task, the operator is allowed to enter the load area, and is informed accordingly, for example by a green signal, block 71. As soon as the operator has finished his work in the load area, he activates the activation mean 8. The axis controller receives the operator-ready signal, block 72. As long as no operator-ready signal is received, the axis controller is continued to be in the first task. When the operator-ready signal is received, the axis computer is set into the second task, block 74. In the second task, all axes are allowed to move. During the second task the station exchanger 7 is moved about its axis A3 and the location of the positioners 4, 5 are switched.

When the station exchanger is ready, the axis controller is changed into the third task, block 76, and the operator is informed that he is allowed to enter the load area, block 78. In the third task the axis of the movements of the second positioner 5 is controlled according to the instructions in the robot control program, and the axis of the first positioner 4 and the axis A3 of the station exchanger are commanded to a standstill. During the third task the operator loads a new workpiece into the first positioner 4. When the operator has left the load area 9a, he activates the activation means 8. The axis controller receives the operator-ready signal, block 80. The axis controller stays in the third task as long as no operator-ready signal is received. When the operator-ready signal is received, the axis controller switches into the second task, block 82, which allows all axes to be moved. During the second task, the station exchanger 7 is moved about its axis A3 and the location of the positioners 4, 5 is switched. When the station exchanger is ready, the axis controller is switched into the first task, block 70 and the operator is informed that he is allowed to enter the load area, block 71. Thereafter, the procedure described with reference to block 70-block 82 is continuously repeated. The blocks 70-90 represent a work cycle of the robot system. According to the invention, during a work cycle the drive units 53-55 are kept enabled, i.e. the switch 59 is closed.

The safety controller 58 is adapted, upon detecting that a human is entering the load area of the workcell, to continuously supervise, at least as long as the human is within the load area, whether any of the station exchanger and the positioner located in the load area is moving. The safety controller is further adapted to generate a signal which at least disables the drive unit of the moving axis if it is detected that any of the supervised axes is moving, and to keep the drive units or the supervised axes enabled if it is decided that the supervised axes are not moving.

Figure 10:
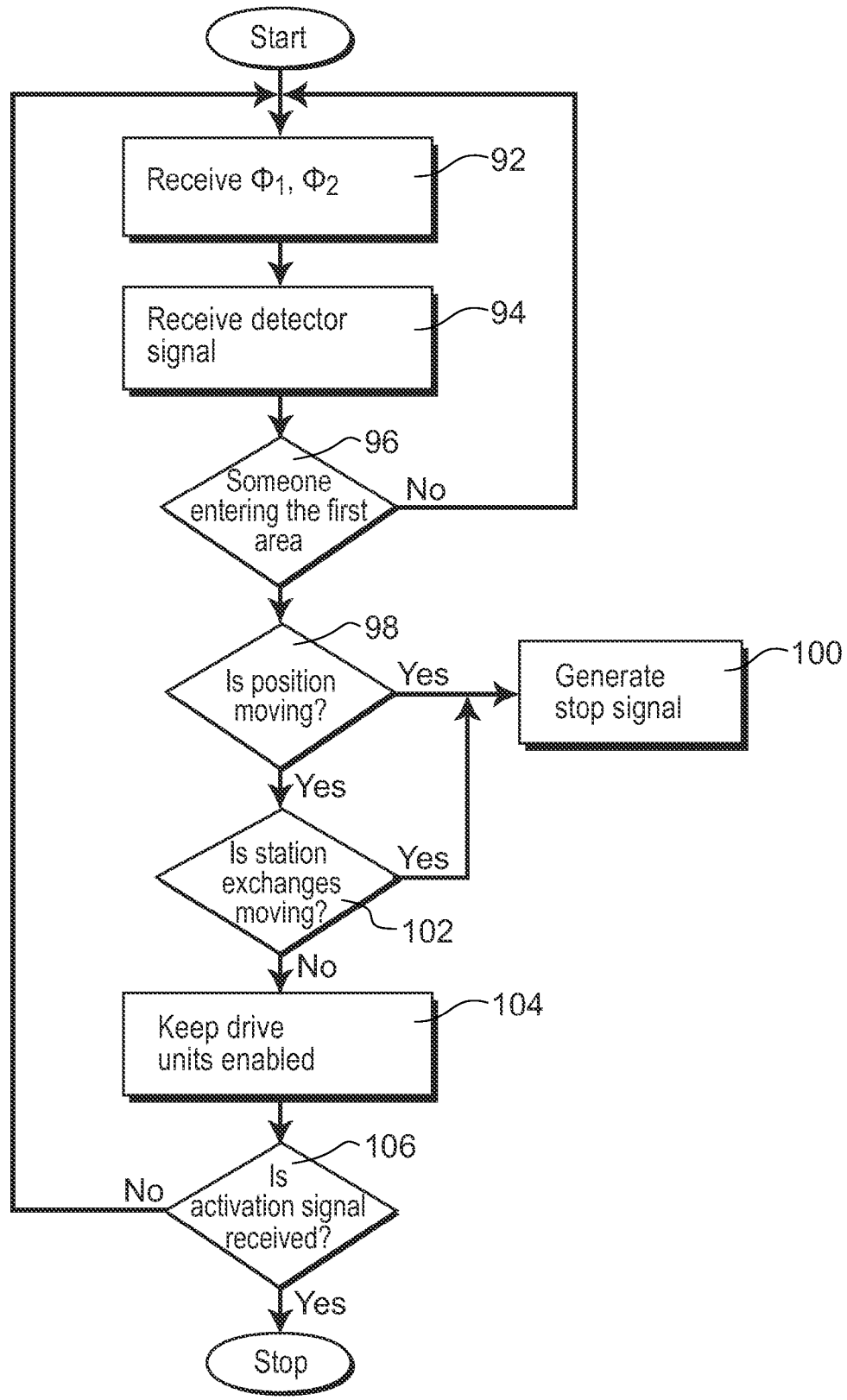
FIG. 10 shows an example of a flow diagram for a safety controller.

FIG. 10 shows an example of a flow diagram for the safety controller 58. This example relates to the workcell type shown in FIG. 5. However, the same method can be used for any of the other types shown in FIGS. 1-4. Values of the positions $\Phi_1$, $\Phi^{ref2}$ of the supervised axes, i.e. the axes of the station exchanger and the positioner located in the load area are received, block 92. The signal from the detector 6, which detects when a human enters the load area of the workcell, is received, block 94. It is determined whether someone is entering the load area based on the received detector signal, block 96. If it is not detected that a human is entering the load area, the positions of the supervised axes and the detector signal are continued to be received.

Upon detecting that a human is entering the load area of the workcell, it is continuously determined whether the axis of the positioner located in the load area is moving based on the received positions of the axis of the positioner, block 98. For example, the velocities of the axes are calculated based on the received measured positions and a known time interval between the position measurements. If the calculated velocity is larger than a limit value, it is determined that the axis is moving; otherwise, the axis is not moving. Preferably, the limit value of the velocity is set to be very low, but it will allow small not visible movements of the axis.

If it is detected that the positioner in the load area is moving, a stop signal is generated, block 100. The stop signal disables the drive unit of the moving axis, for example by opening the switch 59 of the AC power supply to the drive unit. Preferably, the stop signal disables the drive units 53-55 of all axes. It is also possible that the stop signal applies the brakes to the motors M1, or to all motors M1-M3. In the same way, it is continuously checked whether the axis of the station exchanger is moving, block 102. If the station exchanger is moving, a stop signal is generated, block 100. If none of the axes of the positioner located in the load area or the axis of the station exchanger is moving, the drive units are kept enabled, block 104.

The safety controller 58 further receives the operator-ready signal from the activation means 6. The supervision is continued until the operator-ready signal is received, block 106.

Alternatively, the supervision is continued until the detector 6 detects that the human leaves the workcell.

The above supervision algorithm provided by the safety controller ensures that the axes commanded to a standstill are not moving. If any of the axes commanded to a standstill is moving while the operator is within the load area, an accident may happen.

However, it can be possible for the operator to select a manual task in which it is possible for the operator to manually move the axes of the station exchanger and the positioner in the load area, when the operator is within the load area. In this case, the operator overrides the safety system. However, the axes are only allowed to move at a slow speed.

The invention claimed is:

1. An industrial robot system comprising:
    a workcell including a load area and a process area,
    at least one detector detecting when a human enters the load area of the workcell,
    a manipulator located in the workcell and adapted to process a workpiece,
    at least one positioner adapted to hold the workpiece and to change an orientation of the workpiece about at least a first axis while the manipulator processes the workpiece, said first axis controlled by a first motor and a first drive unit,
    a station exchanger movable about a second axis and adapted to move, upon command, the manipulator or the positioner between said load and process area of a workcell, said second axis controlled by a second motor and a second drive unit,
    an axis controller configured to control the first and second drive units,
    a safety controller configured to continuously receive information on the positions of the first and second axes and information on the presence of a human within the load area from the detector,
    wherein the axis controller is configured to switch between executing at least two tasks: a first task in which the first and second drive units are instructed by the axis controller to standstill for allowing a human to enter the load area, and a second task in which the first and second drive units are allowed to move, and
    wherein the safety controller is further configured to generate a stop signal to disable the first drive unit upon receiving information of a human detected within the load area while the first axis is moving within the load area, and
    wherein the safety controller is further configured to generate a stop signal to disable the second drive unit upon receiving information of a human detected within the load area while the second axis is moving.

2. The industrial robot system according to claim 1, further comprising:
    a second positioner adapted to hold a workpiece and to change the orientation of the workpiece about at least one axis, the station exchanger is adapted to change, upon command, which one of the positioners the manipulator is performing work on, and said safety controller is adapted to continuously receive information on the position of a second positioner, and upon detecting that someone is entering the load area of the workcell, to determine which positioner is within the load area, to continuously detect, at least as long as someone is within the load area, whether any of the station exchanger or the positioner determined to be within said load area is moving, and if it is detected that any of the station exchanger or the positioner determined to be within said load area is moving, to generate a signal which disables the drive unit of the moving axis.

3. The industrial robot system according to claim 2, wherein the safety controller is adapted to determine which of the positioners is within the process area, and the axis controller is adapted control the movements of said three axes by switching between at least two tasks: a first task in which the axes of the station exchanger and the positioner determined to be within the load area are commanded to a standstill and the axis of the positioner determined to be within the process area is allowed to move, and a second task in which the axes of the station exchanger and the positioners are allowed to move.

4. The industrial robot system according to claim 2, wherein said safety controller is adapted to determine which positioner is within the load area and which positioner is within the process area based on the position of the axis of the station exchanger.

5. The industrial robot system according to claim 1, further comprising:
    an activator located outside the workcell, wherein the activator is adapted to generate an operator-ready signal upon activation of a human, and wherein said axis controller is adapted to receive said operator-ready signal and switch to said second task upon receiving the operator-ready signal.

6. The industrial robot system according to claim 2, wherein the load area includes said first positioner and said process area includes said second positioner, each load area being provided with a detector detecting when someone enters the load area, and the station exchanger is adapted to move the manipulator between the load and process area, and said safety controller is adapted to determine upon detecting that someone is entering any of the load areas, whether the manipulator is within the process area corresponding to the entered load area or not, and to generate a stop signal to the manipulator if the manipulator is within the corresponding process area.

7. A method for controlling a plurality of axes in an industrial robot system comprising: a workcell including a load area and a process area, at least one detector detecting when a human enters the load area of the workcell, a manipulator located in the workcell and adapted to process a workpiece, at least one positioner adapted to hold the workpiece and to change an orientation of the workpiece about at least a first axis while the manipulator processes the workpiece, said first axis controlled by a first motor and a first drive unit, a station exchanger movable about a second axis and adapted to move, upon command, the manipulator or the positioner between said load and process area, said second axis controlled by a second motor and a second drive unit, an axis controller and a safety controller, the method comprising the computer implemented steps of:
    sending instructions from the axis controller to the first and second drive units for switching between the execution of at least two tasks: a first task in which the first and second drive units are instructed to standstill and a human is allowed to enter the load area, and a second task in which the first and second drive units are allowed to move and a human is not allowed to enter the load area,
    continuously sending information on the position of the first and second axes to the safety controller,
    continuously sending information on the presence of a human within the load area from the detector to the safety controller,
    wherein upon detecting that a human is entering the load area of the workcell, continuously supervising, at least as long as the human is within the load area, whether any of the axes are moving, generating a stop signal by the safety controller and sending the stop signal to disable the first drive unit if it is detected that the first axis is moving within the load area, generating a stop signal by the safety controller and sending the stop signal to disable the second drive unit if it is detected that the second axis is moving, and keeping the drive units of the supervised axes enabled if it is decided that the first axis is not moving within the load area and the second axis is not moving.

8. The method according to claim 7, wherein the industrial robot system comprises a second positioner adapted to hold a workpiece and to change the orientation of the workpiece about at least one axis, and the station exchanger is adapted to change, upon command, which one of the positioners the manipulator is performing work on, the method further comprising:

continuously receiving information on the position of the second positioner, and upon detecting that someone is entering said load area of the workcell, determining which of the positioners is within the load area, and continuously detecting, at least as long as someone is within the load area, whether any of the station exchanger or the positioner determined to be within said load area is moving, and if it is detected that any of the station exchanger or the positioner determined to be within said load area is moving, to generate a signal which disables the drive unit of the moving axis.

9. The method according to claim 8, further comprising:
determining which of the positioners is within the process area, and
switching between at least two tasks: a first task in which the axes of the station exchanger and the positioner determined to be within the load area are commanded to a standstill and the axis of the positioner determined to be within the process area is allowed to move, and a second task in which the axes of the station exchanger and the positioners are allowed to move.

10. The method according to claim 8, further comprising:
determining which positioner is within the load area and which positioner is within the process area based on the position of the axis of the station exchanger.

11. The method according to claim 7, wherein the robot system further comprises an activator located outside the workcell and adapted to generate an operator-ready signal upon activation by a human, and wherein switching to said second task is performed upon receiving the operator-ready signal.

12. The industrial robot system according to claim 1, wherein a stop signal generated by the safety controller only affects the moving axes.

13. The industrial robot system according to claim 1, wherein a stop signal generated by the safety controller affects all drive units.

14. The method according to claim 7, wherein a stop signal generated by the safety controller only affects the moving axes.

15. The method according to claim 7, wherein a stop signal generated by the safety controller affects all drive units.

* * * * *